United States Patent [19]
Miyagi et al.

[11] Patent Number: 5,809,207
[45] Date of Patent: Sep. 15, 1998

[54] DIGITAL SIGNAL RECORDING AND/OR REPRODUCING APPARATUS HAVING A PHASE-LOCKED LOOP FOR GENERATING A CLOCK SIGNAL FROM RECORDING SIGNALS DURING A RECORDING OPERATION AND REPRODUCING SIGNAL DURING A REPRODUCING OPERATION AND A METHOD THEREOF

[75] Inventors: Shiro Miyagi; Yasutaka Kotani, both of Tokyo, Japan

[73] Assignee: Sony Corporation, Tokyo, Japan

[21] Appl. No.: 601,944

[22] Filed: Feb. 15, 1996

[30] Foreign Application Priority Data

Feb. 21, 1995 [JP] Japan .................................. 7-056603

[51] Int. Cl.$^6$ .............................. H04N 5/76; H04N 5/92
[52] U.S. Cl. .............................. 386/116; 386/124; 360/51
[58] Field of Search ................. 360/51, 52; 386/13–20, 386/34, 40, 26, 44, 85–91, 124–126; H04N 5/76, 5/92, 9/79

[56] References Cited

U.S. PATENT DOCUMENTS

| | | | |
|---|---|---|---|
| 4,875,108 | 10/1989 | Minuhin et al. | 360/51 |
| 5,200,834 | 4/1993 | Iwaibana et al. | 386/26 |
| 5,208,678 | 5/1993 | Nakagawa | 386/104 |
| 5,260,842 | 11/1993 | Leake et al. | 360/51 |
| 5,323,242 | 6/1994 | Yamamoto et al. | 386/41 |
| 5,386,323 | 1/1995 | Ishiwata et al. | 360/51 |
| 5,426,538 | 6/1995 | Kanota et al. | 360/48 |
| 5,519,545 | 5/1996 | Kawahara | 360/51 |

FOREIGN PATENT DOCUMENTS 0 561 281 A1  9/1993  European Pat. Off. .

OTHER PUBLICATIONS

IBM Technical Disclosure Bulletin, vol. 1, No. 5, Feb. 1959, New York, U.S., pp. 1–2, F.M. Trapnell, Jr.: "Self Clocked Revolver. Feb. 1959."

Patent Abstracts of Japan, vol. 018, No. 399 (P–1776), Jul. 26, 1994 & JP–A–06 111489 (Sony Corp). Apr. 22, 1994.

*Primary Examiner*—Thai Tran
*Attorney, Agent, or Firm*—Frommer Lawrence & Haug LLP; William S. Frommer; Dennis M. Smid

[57] ABSTRACT

An apparatus and method for recording and/or reproducing a digital signal. An input digital signal is received and processed by a recording processing device so as to form a recording signal. The recording signal may be recorded onto and reproduced from a recording medium. The reproduced signal may be processed by a reproducing processing device so as to form an output signal. Processing performed by the reproducing processing device may be controlled by a clock signal provided by a phase-locked loop (PLL) circuit. The PLL circuit respectively receives the recording and reproduced signals when the apparatus is operating in a recording mode and a reproducing mode, and generates the clock signal therefrom. Alternatively, instead of the recording signal, the PLL circuit may receive a leakage current when the apparatus is operating in the recording mode. In this latter situation, the PLL circuit generates the clock signal from the leakage current and the reproduced signal. As a result, signals may be satisfactorily reproduced and processed even after operations (such as after-recording operations) wherein reproduced signals are unavailable for supply to the PLL circuit are completed.

18 Claims, 4 Drawing Sheets

DIGITAL SIGNAL RECORDING AND/OR REPRODUCING APPARATUS HAVING A PHASE-LOCKED LOOP FOR GENERATING A CLOCK SIGNAL FROM RECORDING SIGNALS DURING A RECORDING OPERATION AND REPRODUCING SIGNAL DURING A REPRODUCING OPERATION AND A METHOD THEREOF

BACKGROUND OF THE INVENTION

The present invention relates to a technique for recording/reproducing a digital signal which may be applicable to a rotary head type video cassette tape recorder (VCR) and, more particularly, to such technique which prevents or minimizes frequency deviation of a clock signal produced by a phase-locked loop (PLL) circuit.

Digital VCRs may have a rotary head and may record and/or reproduce digital signals onto and/or from a magnetic tape or other medium. Such digital VCRs may provide recording areas for processed digital video signals and recording areas for processed digital audio signals on the tape. Furthermore, such digital VCRs may record digital audio signals by a so-called after-recording process.

The above-described digital VCRs may include a PLL circuit having a voltage controlled oscillator (VCO) for producing clock signals which are synchronized with (or "locked to") the reproduced signals and which may be utilized to process the reproduced signal. However, during after-recording, reproduced signals may not be generated and supplied to the PLL circuit. As a result, during such after-recording, the VCO of the PLL circuit may oscillate at a predetermined free-running frequency. When the after-recording mode is completed, the PLL circuit may again lock to the reproduced signal.

The free-running frequency of the VCO may deviate from an initially determined value due to changes in temperature, aged deterioration, and so forth. If such deviation occurs, then the time for the PLL circuit to lock to the reproduced signal after the after-recording mode is completed may increase and the clock signal generated by the PLL circuit may be asynchronous with the reproduced signal until the PLL circuit locks to the reproduced signal. Accordingly, the signal reproduced immediately or shortly after the after-recording mode is completed may not be properly processed.

One method of solving the above-described problem is to provide a relatively long introduction or preamble area between each digital audio signal recording area and a subsequent recording area. However, such approach may not be desirable as it reduces areas on the tape which may otherwise be used for data recording and reproduction.

Another approach for solving the above problem is to use a second or additional oscillator or PLL capable of generating a reference signal which is supplied to the first PLL circuit when reproduced signals are not supplied thereto. However, such approach increases the complexity and cost of the digital VCR.

OBJECTS AND SUMMARY OF THE INVENTION

An object of the present invention is to provide a technique for recording/reproducing digital signals which prevents or minimizes frequency deviation of a clock signal produced by a PLL circuit and utilized for processing a reproduced signal even when the reproduced signal is not supplied to the PLL circuit.

More specifically, it is an object of the present invention to provide a technique as aforesaid wherein the reproduced signal is supplied to the PLL circuit so as to generate a clock signal synchronized thereto and wherein a recording signal or a leakage signal produced from recording current is supplied to the PLL circuit and utilized for generating the clock signal when the reproduced signal is unavailable.

Another object of the present invention is to provide a technique as aforesaid which does not utilized a second or additional oscillator and, as such, minimizes costs and circuit complexity.

In accordance with an aspect of the present invention, a digital signal recording/reproducing apparatus is provided which comprises a recording processing circuit for processing an input signal so as to form a recording signal;.a device for recording the recording signal onto a recording medium and for reproducing the recorded signal from the recording medium; a reproducing processing circuit for processing the reproduced signal so as to form an output signal; and a phase-locked loop (PLL) circuit for receiving a reference signal and for generating a clock signal therefrom which is synchronous with the recording signal and the reproduced signal and for supplying the clock signal to the reproducing processing circuit. The apparatus is adapted to operate in time-divisional periods in which recording, operations are performed in recording periods and reproducing operations are performed in reproducing periods. The reference signal is the recording signal during the recording periods and the reproduced signal during the reproducing periods.

In accordance with another aspect of the present invention, a digital signal recording/reproducing apparatus is provided which comprises a device for recording an input signal onto a recording medium and for producing a leakage signal therefrom and for reproducing the recorded signal from the recording medium; a processing device for processing the reproduced signal in accordance with a clock signal so as to form an output signal; and a phase-locked loop (PLL) circuit for receiving the leakage signal when the apparatus is operating in a recording mode, for receiving the reproduced signal when the apparatus is operating in a reproducing mode, for generating the clock signal from the received leakage and reproduced signals, and for supplying the clock signal to the processing device.

Thus, the PLL circuit receives a reproduced signal when available and utilizes such reproduced signal as a reference signal to form a clock signal which is synchronous to the reproduced signal. Such clock signal may be utilized to control the processing of the reproduced signal. When a reproduced signal is not supplied to the PLL circuit for a time period, such as during after-recording, the PLL receives a recording signal or a leakage signal corresponding to the leakage of the recording current which is utilized as the reference signal to form the clock signal. As a result, the clock signal generated by the PLL circuit does not substantially deviate from the reproduced signal even with changes in the free-running frequency of the VCO of the PLL circuit due to changes in temperature characteristics, changes caused by aged deterioration and so forth. Accordingly, the present recording/reproducing apparatus may process a signal reproduced immediately or shortly after completion of a recording period wherein a reproduced signal is not generated and supplied to the PLL circuit (such as the after-recording mode).

Other objects, features and advantages of the present invention will become apparent from the following detailed description of the illustrated embodiments when read in

DETAILED DESCRIPTION OF PREFERRED EMBODIMENTS

Figure 1:
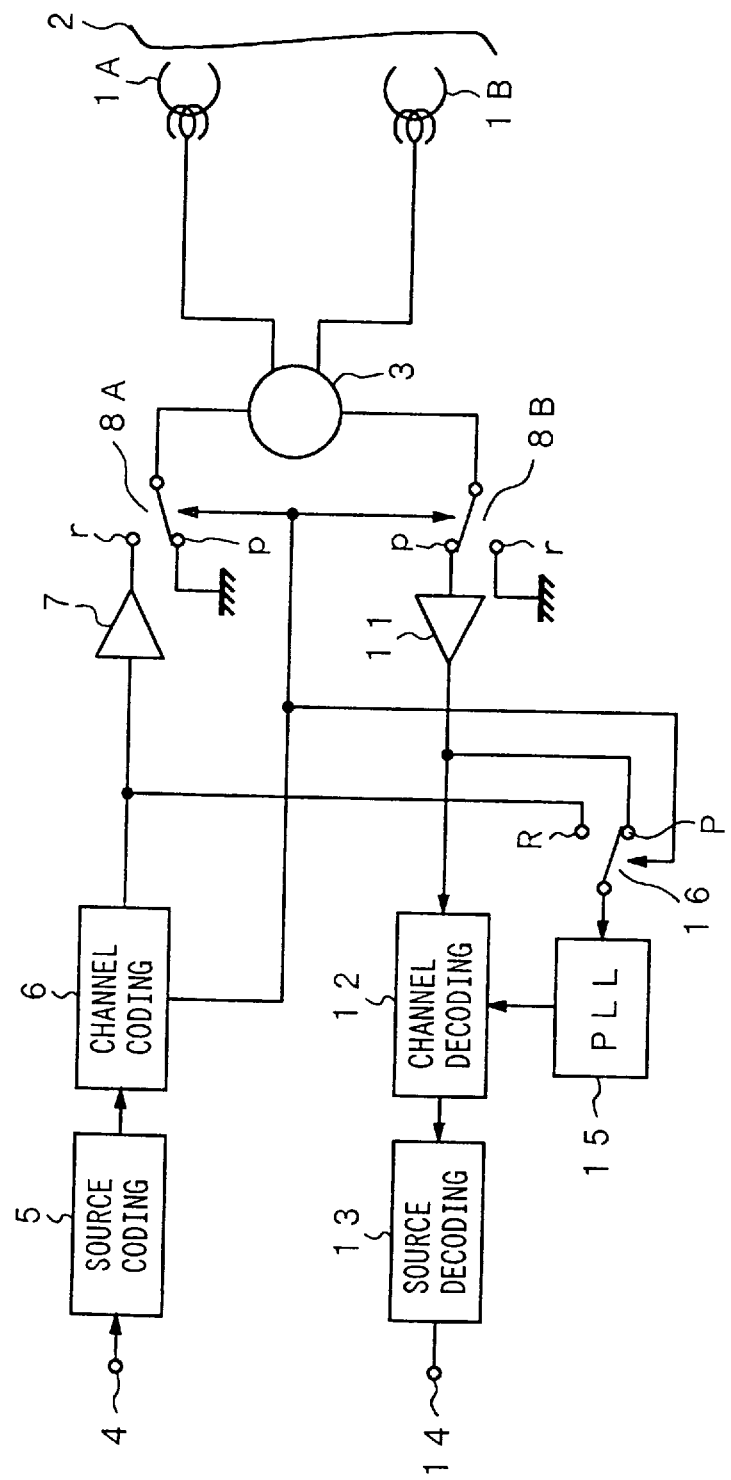
FIG. 1 is a diagram of a recording and/or reproducing apparatus according to an embodiment of the present invention.

FIG. 1 illustrates an apparatus for recording and/or reproducing signals according to a preferred embodiment of the present invention. Such apparatus generally includes a pair of heads 1A and 1B, a rotary transformer 3, a source coding circuit 5, a channel coding circuit 6, record/reproduce changeover switches 8A and 8B, a channel decoding circuit 12, a source decoding circuit 13, a phase-locked loop (PLL) circuit 15, and a switch 16 which are coupled as shown in FIG. 1.

A magnetic tape 2 may be wound around a portion of a rotary drum (not shown). Such portion may cover an angle slightly larger than 180 degrees. The heads 1A and 1B may be arranged at an interval of approximately 180 degrees on the rotary drum. Such heads are adapted to alternately trace the magnetic tape 2 so as to record and/or reproduce signals onto and/or from the tape. Signals to and from the heads 1A and 1B are supplied thereto and therefrom by way of the rotary transformer 3. Such rotary transformer may include a rotor yoke which may simultaneously rotate with the drum, a stationary stator yoke mounted in a corresponding arrangement with the rotor yoke, and coils provided in grooves of the respective yokes.

Input signals, such as, a digital video signal, a digital audio signal and a sub-code signal, are supplied through an input terminal 4 to the source coding circuit 5. The source coding circuit 5 processes the received signals in a predetermined manner which may involve data compression and coding for error correction. An output signal from the source coding circuit 5 is supplied to the channel coding circuit 6, wherein digital modulation of the received signal is performed. As an example, data of 24 bits may be mapped into data of 25 bits so as to obtain a recording digital signal having a reduced d.c. component.

An output signal from the channel coding circuit 6 is supplied to a recording amplifier 7, wherein the received signal is amplified and supplied to a record terminal r of the record/reproduce changeover switch 8A. The switch 8A further includes a playback terminal p which is coupled to ground. A record/reproduce changeover control signal generated by the channel coding circuit 6 is supplied to the switch 8A so as to control the same such that the switch 8A is connected to the terminal r during recording and is connected to the terminal p during playback or reproduction. An output terminal of the switch 8A is coupled to the transformer 3. Accordingly, during recording, the switch 8A is connected to the r terminal, whereupon an output signal from the switch 8A is supplied through the rotary transformer 3 to the heads 1A and 1B and recorded on the tape 2. On the other hand, during reproduction, the switch 8A is connected to the terminal p, whereupon a processed signal is not supplied to the heads 1A and 1B and recorded on the tape 2.

Signals reproduced by the heads 1A and 1B are supplied through the transformer 3 to an input terminal of the record/reproduce changeover switch 8B. The switch 8B also includes a record output terminal r which is coupled to ground and a playback output terminal p which is coupled to a reproducing amplifier 11. In a manner similar to that of switch 8A, the switch 8B is controlled by the record/playback changeover control signal from the channel coding circuit 6. As such, during reproduction, the switch 8B is connected to the p terminal, whereupon a signal reproduced from the tape 2 by the heads 1A and 1B is supplied by way of the rotary transformer 3 to the reproducing amplifier 11 so as to be amplified. On the other hand, during recording, the switch 8B is connected to the terminal r, whereupon a reproduced signal from the tape 2 is not supplied to the reproducing amplifier 11.

An amplified reproduced signal from the reproducing amplifier 11 is supplied to the channel decoding circuit 12 which processes such signal in a manner substantially opposite to that performed by the channel coding circuit 6. The channel decoding circuit 12 may include a time-base compensator (TBC) which removes or excludes time-base-varied components from the reproduced signal. A clock signal generated by the PLL circuit 15 is also supplied to the channel decoding circuit 12. Such clock signal may be utilized to control the processing or decoding operations performed by the channel decoding circuit 12. As an example, the clock signal may determine the timing for signal processing up to the input or write side of the TBC. After the output or read side of the TBC, the timing may be determined based on a clock having a fixed frequency.

The PLL circuit 15 generates the clock signal in accordance with a reference signal supplied from the switch 16. That is, the switch 16 has an input terminal R which is adapted to receive the output signal of the channel coding circuit 6 and an input terminal P which is adapted to receive the output signal of the reproducing amplifier 11. The operation of the switch 16 is controlled by the record/playback changeover control signal from the channel coding circuit 6. As such, the switch 16 is connected to the input terminal R during recording and is connected to the input terminal P during reproduction. Accordingly, the reference signal supplied to the PLL circuit 15 from the switch 16 is the output signal of the reproducing amplifier 11 during reproduction and is the output signal from the channel coding circuit 6 during recording.

An output signal from the channel decoding circuit 12 is supplied to the source decoding circuit 13, wherein processing is performed which is substantially opposite to that performed by the source coding circuit 5 so as to obtain a reproduced video signal, a reproduced audio signal and a reproduced sub-code signal. Such reproduced signals are supplied to an output terminal 14.

Figure 2:
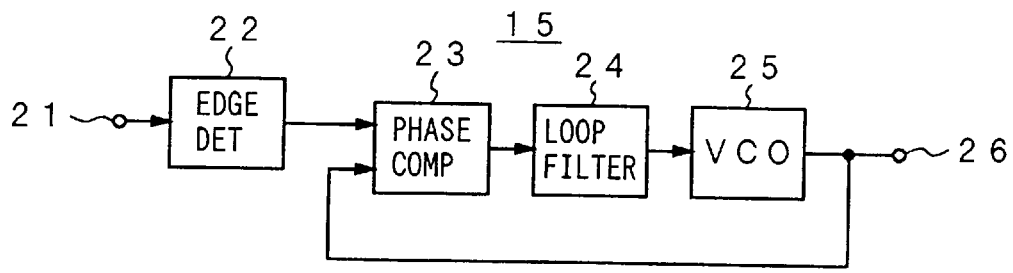
FIG. 2 is a diagram of a PLL circuit of the apparatus of FIG. 1.

The PLL circuit 15 may be configured as shown in FIG. 2. That is, the PLL circuit may include an edge detector circuit 22, a phase comparator circuit 23, a loop filter 24 and a VCO 25 which are coupled as shown in FIG. 2. An input signal (such as the reference signal from the switch 16) is supplied through an input terminal 21 to the edge detector circuit 22 so as to detect the edge thereof. A detection signal from the edge detector circuit 22 is supplied to one input of the phase comparator circuit 23. An output signal from the VCO 25 is supplied to another input of the phase comparator circuit 23. The phase comparator circuit compares the two received signals and generates a phase comparison output signal therefrom. Such phase comparison signal is supplied as a control voltage to the VCO 25 by way of the loop filter which may include a low pass filter. The output signal from the VCO 25 is supplied to the phase comparator circuit 23 and an output terminal 26. As a result, the PLL circuit 15 produces an output signal from the VCO 25 which is synchronous with the edge of the input or reference signal supplied to the input terminal 21.

Figure 3:
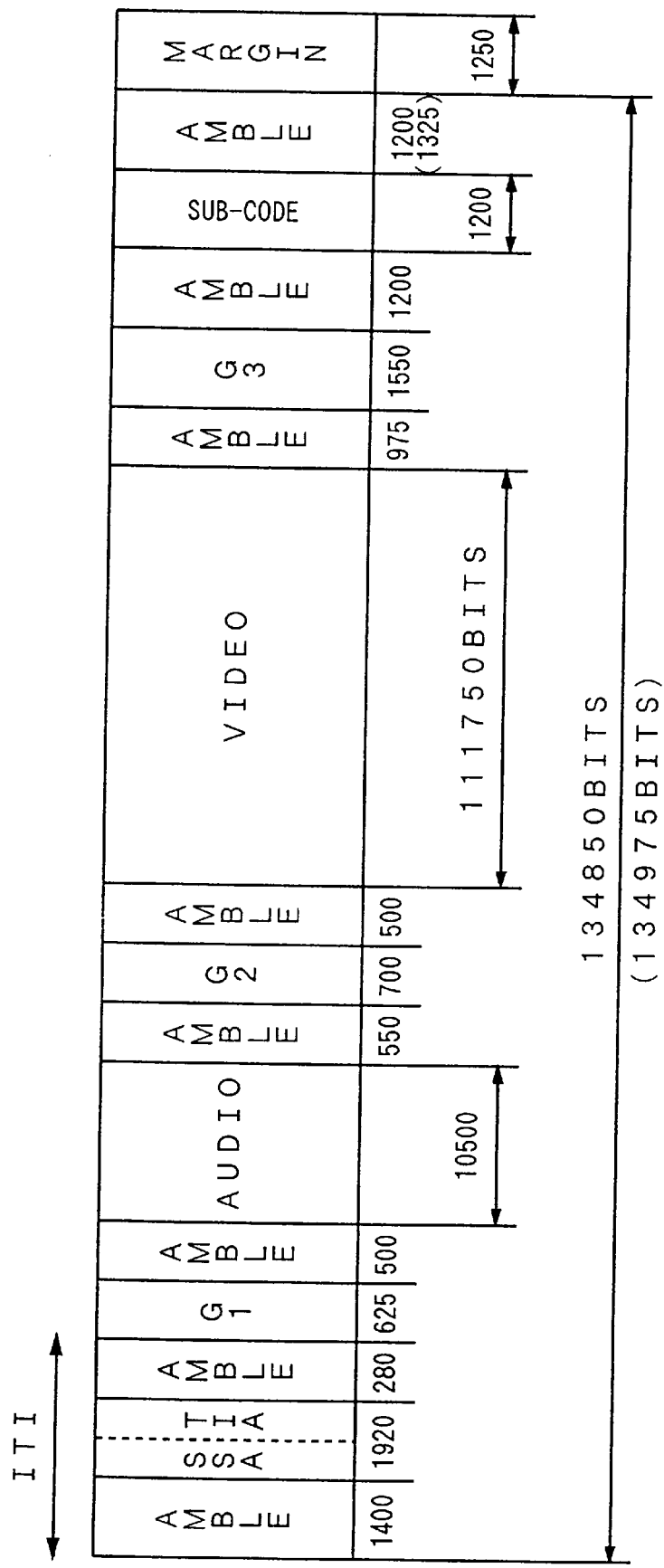
FIG. 3 is a diagram of a track format which may be utilized by the apparatus of FIG. 1.

Referring back to FIG. 1, the heads 1A and 1B may form alternate oblique tracks on the magnetic tape 2. Digital signals may be recorded on these tracks in a predetermined format such as that illustrated in FIG. 3. The number of bits in each area of the track is shown in FIG. 3. In particular, the bit numbers shown therein are for the 625-line/50-field system (bit number after 24/25 conversion), and the bit numbers in parentheses are for the 525-line/60-field system. The format of FIG. 3 will now be described below.

An ITI area is provided at the beginning of the track. (As viewed in FIG. 3, the heads initially contact the tape at the left end of the track and, as such, this location is referred to as the beginning of the track.) The ITI area includes a preamble area, a start sync block area (SSA), a track information area (TIA) and a post-amble area which are arranged as shown in FIG. 3. The preamble area provides lead-in for the PLL processing. The SSA has a length of 61 blocks and the subsequent TIA has a length of 3 blocks in which each block has 30 bits so as to provide a total of 1920 bits. Sync blocks having sync numbers may be recorded in the SSA such that the sync numbers are arranged or added in sequence from the initial end of the area. During processing, such as after-recording, if any one of the sync blocks is detected, then the current position on the track can be accurately determined from the respective sync number. As a result of knowing the current position, a desired area (such as that for after-recording) may be determined. TIA is utilized for recording information pertaining to the track.

Following the ITI area is an audio area which includes a preamble area, a data area wherein audio data may be recorded and a post-amble area. Such audio area is separated from the ITI area by a gap G1. Following the post-amble of the audio area is a gap or guard area G2 and a video area. The video area includes a preamble area, a data area wherein video data may be recorded and a post-amble area. Following the post-amble of the video area is a gap or guard area G3 and a sub-code area. The sub-code area includes a preamble area, a data area wherein sub-codes may be recorded and a post-amble area. Sub-codes are data or information which may be utilized in performing a high-speed search. Following the post-amble of the sub-code area is a margin which is provided at the end of the track. The heads separate from the tape in the margin.

An operation involving the recording of audio data by after-recording in the above-described track format as performed by the recording and/or reproducing apparatus of FIG. 1 will now be explained with reference to FIGS. 4A to 4E.

As previously described, in recording and/or reproducing signals, the heads 1A and 1B alternately trace the magnetic tape 2. This alternating or switching of the heads may be controlled in accordance with a switching pulse which is synchronous with the rotation of the heads, such as that illustrated in FIG. 4A. That is, the head 1A may trace the tape 2 during high level periods of the switching pulse of FIG. 4A, and the head 1B may trace the tape during low level periods of such switching pulse. Alternatively, the head 1A may trace the tape 2 during low level periods of the switching pulse of FIG. 4A, and the head 1B may trace the tape during high level periods of such switching pulse. The data of the track format of FIG. 3 corresponds to approximately 174 degrees of the tape winding angle.

Figure 4A:
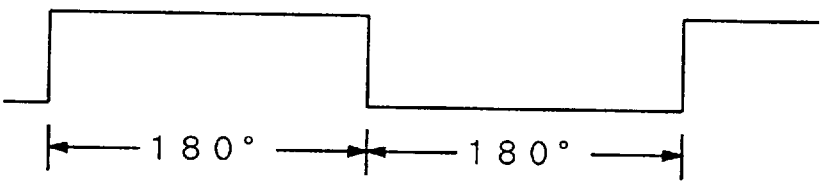
FIGS. 4A, 4B, 4C, 4D and 4E are timing charts to which reference will be made in explaining the operation of the present apparatus of FIG. 1.
Figure 4B:
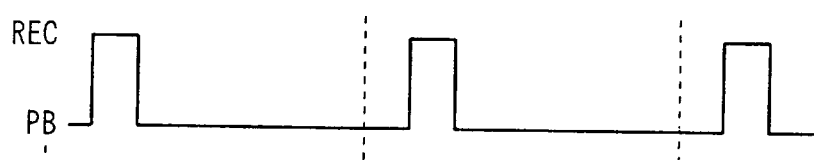

FIG. 4B illustrates a control signal for controlling the record/playback changeover switches 8A, 8B and the switch 16. More specifically, the relatively high level of such control signal corresponds to a recording period or operation and the relatively low level of such control signal corresponds to a playback period or operation. As a result, upon receiving the relatively high level of such control signal, the switches 8A and 8B are coupled to their respective r terminals and the switch 16 is coupled to its R terminal. On the other hand, upon receiving the relatively low level of the control signal, the switches 8A and 8B are coupled to their respective p terminals and the switch 16 is coupled to its P terminal.

Figure 4C:
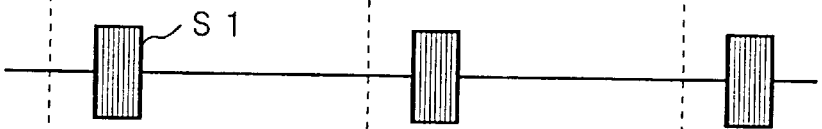
Figure 4D:
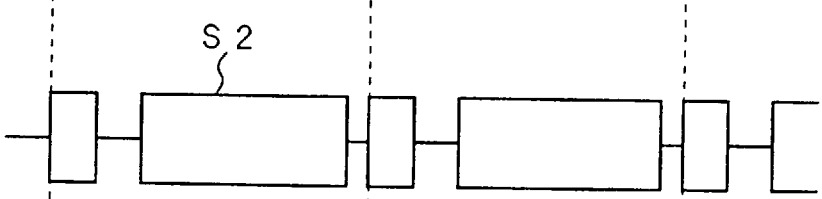

A recording audio signal S1, such as that illustrated in FIG. 4C, may be supplied from the channel coding circuit 6 to the heads 1A and 1B by way of the recording amplifier 7, record terminal r of the switch 8A and the rotary transformer 3. Such signal S1 may be further supplied from the channel coding circuit 6 to the R terminal of the switch 16. A reproduced signal S2, such as that illustrated in FIG. 4D, may be supplied to the channel decoding circuit 12 by way of the rotary transformer 3, the playback terminal p of the switch 8B and the reproducing amplifier 11. Such signal S2 may be further supplied to the P terminal of the switch 16 from the reproducing amplifier 11.

Figure 4E:
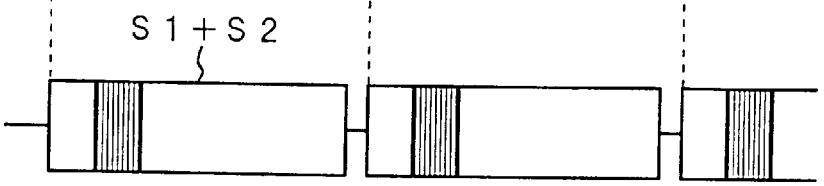

The switch 16 is adapted to sequentially select recording audio signals (such as audio signal S1) and reproduced signals (such as reproduced signal S2) from the R and P terminals, respectively. As a result, the switch may provide an output signal (S1+S2) as illustrated in FIG. 4E. Such output signal may be supplied as a reference signal to the PLL 15.

Therefore, as is to be appreciated, the PLL circuit 15 receives input signals throughout the recording format or track. As such, the PLL circuit 15 receives signals immediately after (or substantially immediately after) recording signals. As a result, upon completing an after-recording operation of an audio signal, the PLL circuit 15 may receive reproduced video signals beginning with amble signals in the video areas (such as the preamble signal of the video area of FIG. 3) and may generate a clock signal therefrom. Such clock signal enables reliable reproduction of signals in the video data areas.

A discontinuity in phase may occur at the boundary of the recording signal and the reproduced signal as, for example, at the boundary of signal S1 and S2 of FIG. 4E. Such discontinuity may result in the PLL circuit 15 having to be locked in again. However, since the oscillating frequency of the VCO is substantially equal, the time required for such phase lock is minimized.

Although in describing the above apparatus the record/playback changeover switches 8A, 8B and the switch 16 were changed simultaneously, such switch changes may not actually occur simultaneously. That is, since the PLL circuit 15 may take time to accommodate or adjust for a change in oscillating frequency after the supply of a reference signal is interrupted, the switch 16 may be respectively changed slightly after the switches 8A and 8B are changed.

Figure 5:
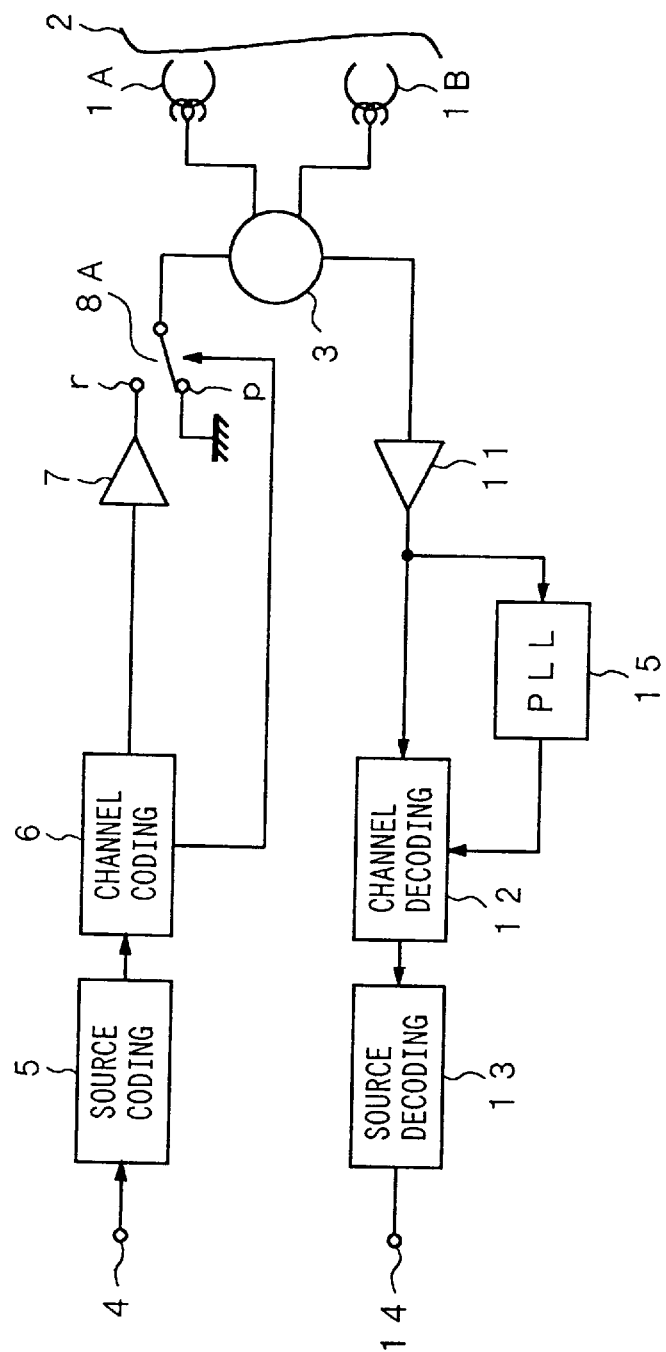
FIG. 5 is a diagram of a recording and/or reproducing apparatus according to another embodiment of the present invention.

FIG. 5 illustrates an apparatus for recording and/or reproducing signals according to another embodiment of the present invention. With the exception that the record/reproduce changeover switch 8B and the switch 16 are omitted, the apparatus of FIG. 5 is substantially similar to that of FIG. 1. The elements of the apparatus of FIG. 5 which are similar to those of FIG. 1 function in a manner similar to that previously described with reference to FIG. 1 and, as such, will not be further described herein. Differences between the apparatus of FIG. 5 and that of FIG. 1 will be described below.

In the apparatus of FIG. 5, the PLL circuit 15 may be supplied with a reproduced signal as a reference signal during a playback period and may generate a clock therefrom for the channel decoding circuit 12. On the other hand, during a recording period, such as when after-recording in an audio area is performed, a leakage signal provided from leakage of a recording current which may occur in the rotary transformer 3 may be supplied as a reproduced or reference signal to the PLL circuit 15 by way of the reproducing amplifier 11. In this latter situation, the PLL circuit 15 may generate a clock signal from such reference (or leakage) signal and may supply the clock signal to the channel decoding circuit 12.

Figure 6:
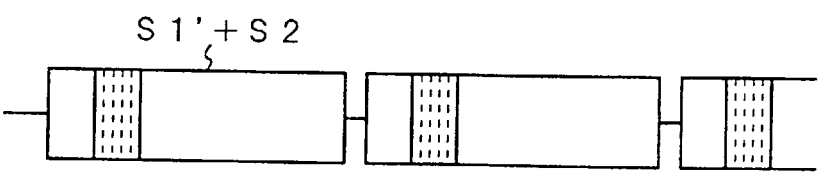
FIG. 6 is a diagram to which reference will be made in explaining the operation of the apparatus of FIG. 5.

Therefore, as shown in FIG. 6, the reference signal for the PLL circuit 15 may include the reproduced signal S2 and the leak or leakage signal S1' of the rotary transformer 3. Such reference signal (S1'+S2) is continuous and is not interrupted throughout the entire track.

Thus, the present recording and/or reproducing apparatus utilizes recording and reproduced signals or leakage and reproduced signals as reference signals for a PLL circuit which, in turn, produces clock signals in accordance with such reference signals. Such recording and reproduced or leakage and reproduced signals are sequentially arranged such that the reference signals are substantially continuous throughout the tracks. Such arrangement prevents or minimizes frequency deviation in the produced clock signals which may otherwise occur during operations such as after-recording operations or immediately thereafter. In other words, the present invention provides a solution to the problem that a signal reproduced immediately or shortly after an after-recording operation is completed may be improperly processed or reproduced since during the after-recording operation a reproduced signal is not supplied to the PLL circuit such that a free-running frequency of a VCO of the PLL circuit is used which may deviate due to temperature characteristics, age deterioration and so forth. Furthermore, the present recording and/or reproducing apparatus does not require a second or additional oscillating circuit, thereby minimizing the size and complexity of the circuit.

Although the present invention was described as being applied to an apparatus wherein audio and video signals may be recorded and/or reproduced, the present invention is not so limited and may be applied to other apparatuses or devices. For example, the present invention may also be applicable to an apparatus for recording digital audio signals alone.

Although preferred embodiments of the present invention and modifications thereof have been described in detail herein, it is to be understood that this invention is not limited to these embodiments and modifications, and that other modifications and variations may be effected by one skilled in the art without departing from the spirit and scope of the invention as defined by the appended claims.

What is claimed is:

1. A digital signal recording/reproducing apparatus operable in time-divisional periods in which recording operations are performed in recording periods and reproducing operations are performed in reproducing periods, said apparatus comprising:

recording processing means for processing an input signal so as to form a recording signal, in which said input signal is any of a digital video signal, a digital audio signal and a sub-code signal;

means for recording said recording signal onto a recording medium and for reproducing the recorded signal from said recording medium so as to form a reproduced signal;

reproducing processing means for processing the reproduced signal so as to form an output signal;

phase-locked loop (PLL) means, coupled to said reproducing processing means and not coupled to said recording processing means, for receiving a reference signal and for generating a clock signal therefrom and for supplying said clock signal only to said reproducing processing means for use in processing said reproduced signal and for not supplying said clock signal to said recording processing means; and means for supplying said recording signal during said recording periods and said reproduced signal during said reproducing periods as said reference signal to said PLL means.

2. The digital signal recording/reproducing apparatus according to claim 1, wherein the supplying means includes two input terminals for respectively receiving said recording signal and said reproduced signal, and wherein said supplying means supplies the received recording signal and the received reproduced signal as said reference signal to an input reference terminal of said PLL means in accordance with a control signal.

3. The digital signal recording/reproducing apparatus according to claim 2, wherein said recording processing means generates said control signal.

4. A digital signal recording/reproducing method comprising the steps of:

processing an input signal by utilizing a recording processing device so as to form a recording signal, in which said input signal is any of a digital video signal, a digital audio signal and a sub-code signal;

recording said recording signal onto a recording medium and reproducing the recorded signal from said recording medium so as to form a reproduced signal;

processing the reproduced signal by utilizing a reproducing processing device so as to form an output signal; and supplying a reference signal to a phase-locked loop (PLL) circuit coupled to said reproducing processing device and not coupled to said recording processing device so as to generate a clock signal therefrom and supplying said clock signal only to said reproducing processing device for use in processing said reproduced signal and for not supplying said clock signal to said recording processing device, said reference signal being said recording signal during recording time-divisional periods in which recording operations are performed and said reference signal being said reproduced signal during reproducing time-divisional periods in which reproducing operations are performed.

5. The digital signal recording/reproducing method according to claim 4, further comprising the step of generating a control signal and wherein said recording signal and said reproduced signal are selectively supplied as said reference signal to an input reference terminal of said PLL circuit by utilizing a switching circuit operated in accordance with said control signal.

6. A digital signal recording/reproducing apparatus comprising:

recording processing means for receiving an input signal and for processing said input signal so as to form a recording signal, in which said input signal is any of a digital video signal, a digital audio signal and a sub-code signal;

means for recording said recording signal onto a recording medium and for reproducing the recorded signal from said recording medium so as to form a reproduced signal;

reproducing processing means for processing the reproduced signal in accordance with a clock signal so as to form an output signal; and phase-locked loop (PLL) means, coupled to said reproducing processing means and not coupled to said recording processing means, for receiving said recording signal when said apparatus is operating in a recording mode, for receiving said reproduced signal when said apparatus is operating in a reproducing mode, for generating said clock signal from the received recording signal when said apparatus is operating in said recording mode and for generating said clock signal from the received reproduced signal when said apparatus is operating in said reproducing mode, and for supplying said clock signal only to said reproducing processing means for use in processing said reproduced signal and for not supplying said clock signal to said recording processing means.

7. The apparatus according to claim 6, wherein said PLL means includes a phase-locked loop (PLL) circuit and a switching device, and wherein the switching device selectively supplies said recording signal and said reproduced signal to an input terminal of said PLL circuit in accordance with a control signal.

8. The apparatus according to claim 7, wherein said recording processing means generates said control signal.

9. A method for recording/reproducing a digital signal, said method comprising the steps of:

receiving an input signal and processing said input signal by a recording processing circuit so as to form a recording signal, in which said input signal is any of a digital video signal, a digital audio signal and a sub-code signal;

recording said recording signal onto a recording medium and reproducing the recorded signal from said recording medium so as to form a reproduced signal;

processing the reproduced signal by a reproducing processing circuit in accordance with a clock signal so as to form an output signal;

supplying said recording signal to a phase-locked loop (PLL) device coupled to said reproducing processing circuit and not coupled to said recording processing circuit when operating in a recording mode and supplying said reproduced signal to said PLL device when operating in a reproducing mode;

generating said clock signal from the received recording signal when said apparatus is operating in said recording mode and generating said clock signal from the received reproduced signal when said apparatus is operating in said reproducing mode; and supplying said clock signal only to said reproducing processing circuit for use in processing said reproduced signal and not supplying said clock signal to said recording processing circuit.

10. The method according to claim 9, further comprising the step of generating a control signal by utilizing said recording processing circuit, and wherein said PLL device includes a phase-locked loop (PLL) circuit and a switching device in which the switching device selectively supplies said recording signal and said reproduced signal to an input terminal of said PLL circuit in accordance with said control signal.

11. A digital signal recording/reproducing apparatus comprising:

recording processing means for receiving an input signal and for processing said input signal so as to form a recording signal, in which said input signal is any of a digital video signal, a digital audio signal and a sub-code signal;

means for recording said recording signal onto a recording medium, for producing a leakage signal therefrom and for reproducing the recorded signal from said recording medium so as to form a reproduced signal;

reproducing processing means for processing the reproduced signal in accordance with a clock signal so as to form an output signal; and phase-locked loop (PLL) means coupled to said reproducing processing means and not coupled to said recording processing means for receiving said leakage signal when said apparatus is operating in a recording mode, for receiving said reproduced signal when said apparatus is operating in a reproducing mode, for generating said clock signal from the received leakage signal when said apparatus is operating in said recording mode and for generating said clock signal from the received reproduced signal when said apparatus is operating in said reproducing mode, and for supplying said clock signal only to said reproducing processing means for use in processing said reproduced signal and for not supplying said clock signal to said recording processing means.

12. The apparatus according to claim 11, wherein the recording and reproducing means includes a transformer and wherein said leakage signal is produced by said transformer.

13. A method for recording/reproducing a digital signal, said method comprising the steps of:

receiving an input signal and processing said input signal by utilizing a recording processing device so as to form a recording signal, in which said input signal is any of a digital video signal, a digital audio signal and a sub-code signal;

recording said recording signal onto a recording medium and producing a leakage signal therefrom and reproducing the recorded signal from said recording medium so as to form a reproduced signal;

processing the reproduced signal in accordance with a clock signal by utilizing a reproducing processing device so as to form an output signal; and supplying said leakage signal to a phase-locked loop (PLL) device coupled to said reproducing processing device and not coupled to said recording processing device when operating in a recording mode and supplying said reproduced signal to said PLL device when operating in a reproducing mode;

generating said clock signal from the received leakage signal when said apparatus is operating in said recording mode and generating said clock signal from the received reproduced signal when said apparatus is operating in said reproducing mode; and supplying said clock signal only to said processing device for use in processing said reproduced signal and for not supplying said clock signal to said recording processing device.

14. The method according to claim 13, wherein said leakage signal is produced by a transformer.

15. A digital signal recording/reproducing apparatus comprising:

recording processing means for processing an input signal so as to form a recording signal;

means for recording said recording signal onto a recording medium and for reproducing the recorded signal from said recording medium;

reproducing processing means for processing the reproduced signal so as to form an output signal; and phase-locked loop (PLL) means for receiving a reference signal and for generating a clock signal therefrom which is synchronous with said recording signal and said reproduced signal and for supplying said clock signal to said reproducing processing means, said apparatus being adapted to operate in time-divisional periods in which recording operations are performed in recording periods and reproducing operations are performed in reproducing periods, and said reference signal being said recording signal during said recording periods and said reproduced signal during said reproducing periods wherein said time-divisional periods include at least one period for reproducing an amble signal in which each amble signal period is between a respective recording period and a subsequent reproducing period, and wherein said amble signal is supplied to said PLL means as said reference signal after the respective recording operation terminates.

16. A digital signal recording/reproducing method comprising the steps of:

processing an input signal so as to form a recording signal;

recording said recording signal onto a recording medium and reproducing the recorded signal from said recording medium;

processing the reproduced signal by utilizing a reproducing processing device so as to form an output signal;

supplying a reference signal to a phase-locked loop (PLL) circuit so as to generate a clock signal therefrom which is synchronous with said recording signal and said reproduced signal and supplying said clock signal to said reproducing processing device, said reference signal being said recording signal during recording time-divisional periods in which recording operations are performed and said reference signal being said reproduced signal during reproducing time-divisional periods in which reproducing operations are performed; and reproducing an amble signal between a respective recording period and an nearby reproducing period, wherein said amble signal is supplied to said PLL circuit as said reference signal after the respective recording operation terminates.

17. A digital signal recording/reproducing apparatus comprising:

recording processing means for receiving an input signal and for processing said input signal so as to form a recording signal;

means for recording said recording signal onto a recording medium and for reproducing the recorded signal from said recording medium;

reproducing processing means for processing the reproduced signal in accordance with a clock signal so as to form an output signal; and phase-locked loop (PLL) means for receiving said recording signal when said apparatus is operating in a recording mode, for receiving said reproduced signal when said apparatus is operating in a reproducing mode, for generating said clock signal from the received recording and reproduced signals, and for supplying said clock signal to said reproducing processing means, wherein said apparatus operates in time-divisional periods including recording periods in which recording operations are performed, reproducing periods in which reproducing operations are performed and amble signal periods in which amble signals are reproduced, each of said amble signal periods is between a respective recording period and a subsequent reproducing period, and wherein said PLL means generates said clock signal from an amble signal after the adjacent recording operation terminates.

18. A method for recording/reproducing a digital signal, said method comprising the steps of:

receiving an input signal and processing said input signal by a recording processing circuit so as to form a recording signal;

recording said recording signal onto a recording medium and reproducing the recorded signal from said recording medium;

processing the reproduced signal by a reproducing processing circuit in accordance with a clock signal so as to form an output signal;

supplying said recording signal to a phase-locked loop (PLL) device when operating in a recording mode and supplying said reproduced signal to said PLL device when operating in a reproducing mode;

generating said clock signal from the received recording and reproduced signals; and supplying said clock signal to said reproducing processing device, wherein recording operations are performed in recording periods, reproducing operations are performed in reproducing periods and amble signals are reproduced in amble signal periods, in which each of said amble signal periods is between a respective recording period and a subsequent reproducing period and wherein an amble signal is supplied to said PLL device after the adjacent recording operation terminates.

* * * * *